Patented Dec. 11, 1951

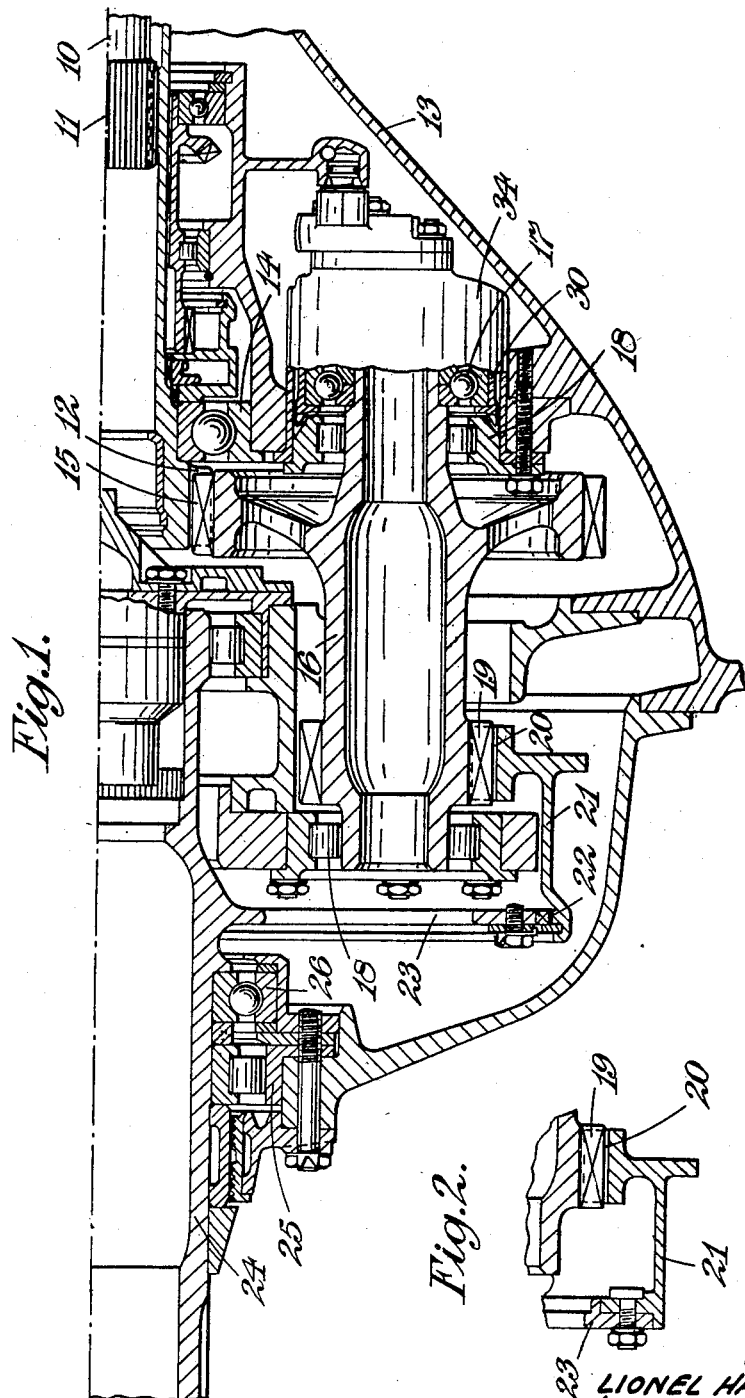

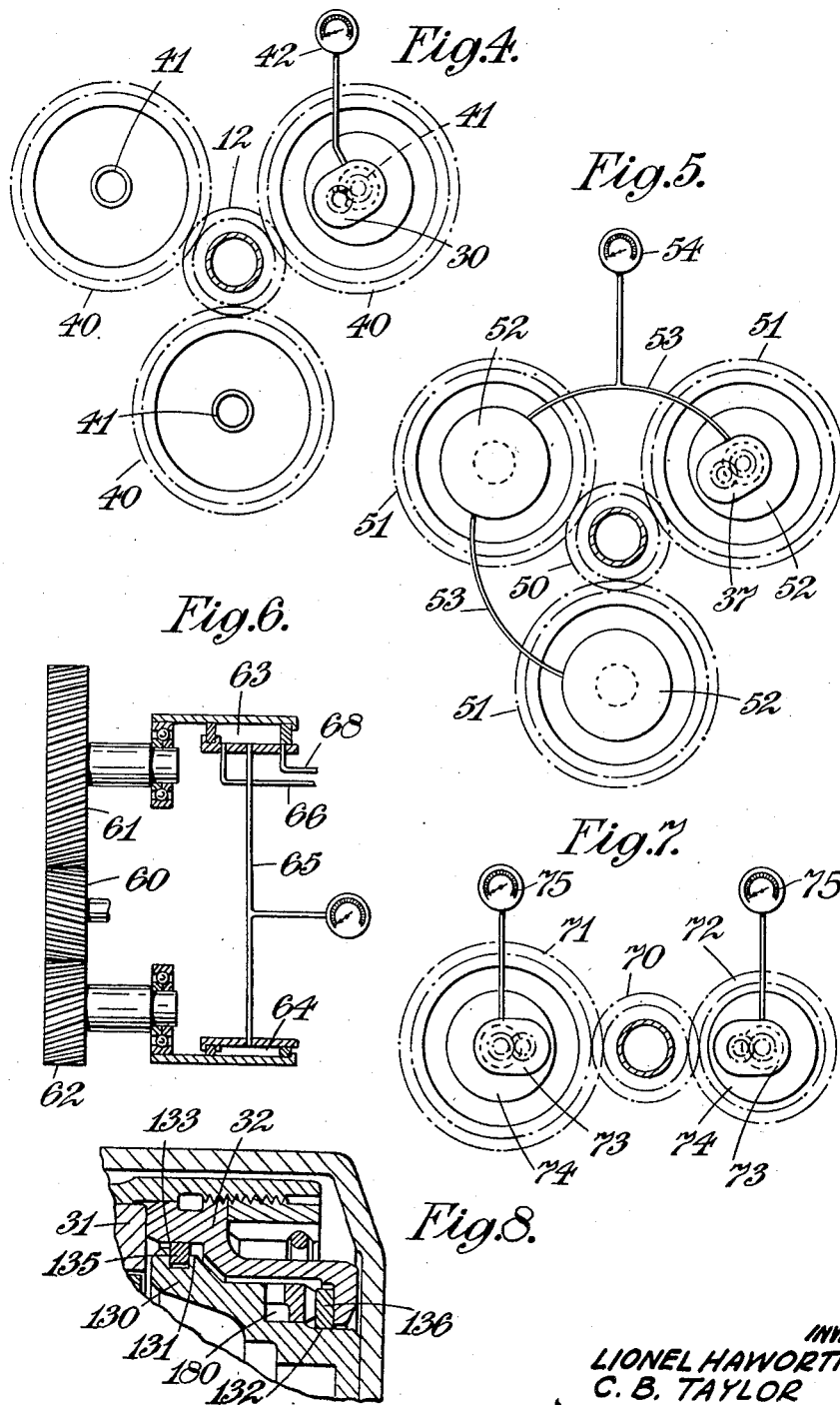

2,578,474

UNITED STATES PATENT OFFICE 2,578,474

TORQUE METER IN GEAR DRIVES

Lionel Haworth and Colin Baynes Taylor, Derby, England, assignors to Rolls-Royce Limited, Derby, England, a British company Application October 25, 1948, Serial No. 56,302
In Great Britain October 31, 1947

3 Claims. (Cl. 73—136)

This invention relates to torque-meters for measuring the torque transmitted through a gear-train. Measurements obtained from such meters, by suitable correlation with shaft-speed, can be used as an indication of the power transmitted through the gear-train.

According to this invention, a gear-train comprises a stationary casing structure; a layshaft having freedom for limited axial movement relative to said casing structure; a gear of the kind which develops axial thrust when torque is transmitted through the gear train supported on said layshaft; thrust-bearing means supporting said layshaft; housing means carrying said thrust-bearing means and including a cylinder element; a piston element arranged for sliding in said cylinder element and fixed with respect to said casing structure; means for supplying pressure fluid to the space within said cylinder element and on one side of said piston element and to oppose the axial thrust transmitted to said housing from said gear; valve means to control the escape of said fluid from said space comprising a variable-area exit port provided in one of said elements, the area of said port being determined by the relative position of the two elements, and means for measuring the pressure in said space.

Embodiments of the invention will now be described by way of example with reference to the accompanying drawings of which:

Figure 1 is a view in section of part of a gear-train to which the invention is applied;

Figure 2 is a detail view of part of an alternative construction;

Figure 4 is a diagrammatic illustration of the gear-train shown in Figure 1;

Figure 5 is a diagrammatic illustration of another construction embodying the invention;

Figure 6 is a diagrammatic illustration, partly in section, of yet another construction embodying the invention;

Fig. 7 is a diagrammatic illustration of yet another construction embodying the invention;

Figure 8 is a section of part of a thrust opposing device used in the constructions illustrated in Figures 5 and 6;

Figure 3:
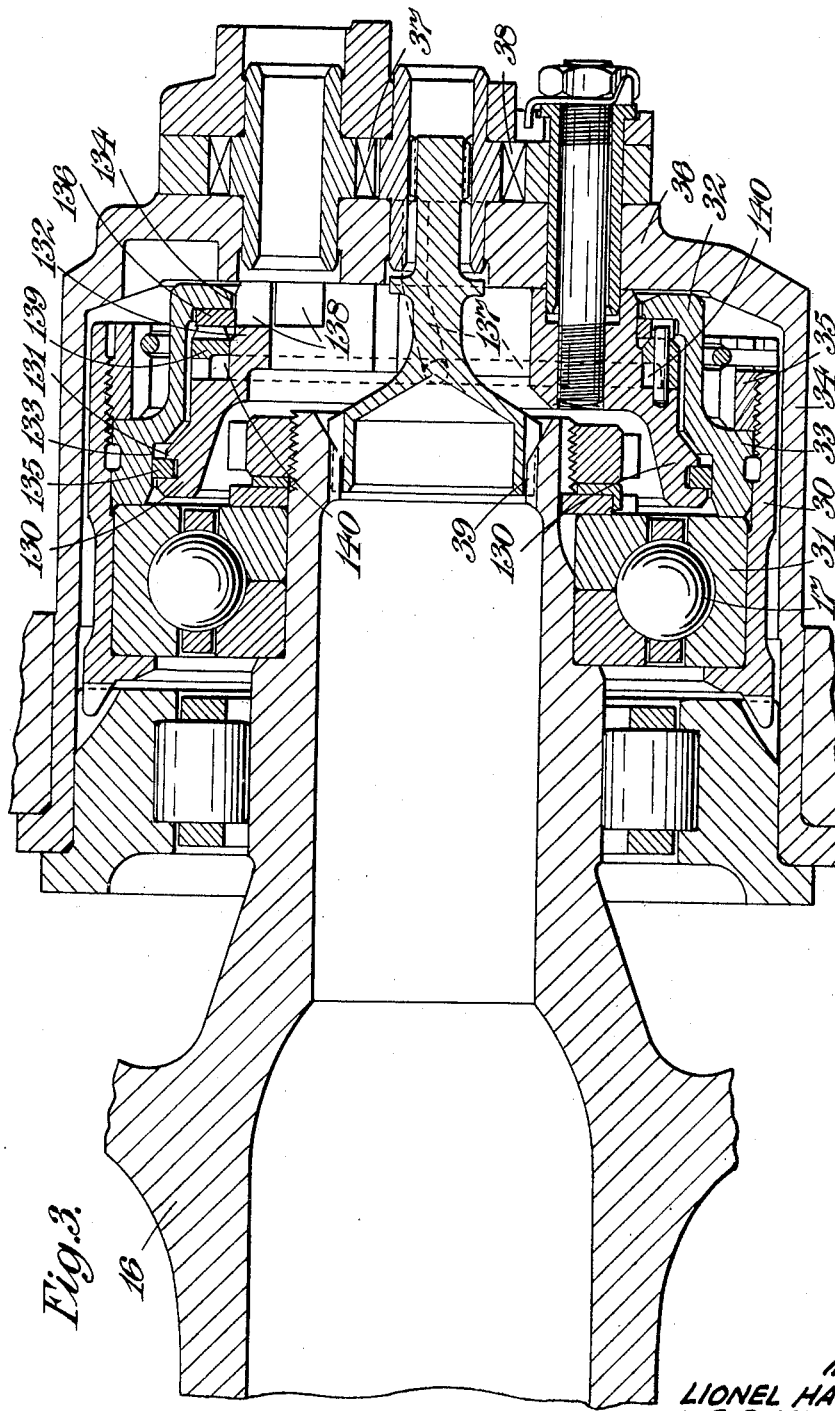
Figure 3 is a section of a hydraulic thrust-opposing device and gear pump comprising a torque-meter according to the invention.

Figures 1 and 4 show a reduction gear between a gas-turbine engine and the airscrew which it drives, and, in Figure 1, the reference numeral 10 denotes the shaft of the turbine which drives through a suitable quill or splined drive 11 a central main driving pinion 12, supported in a reduction gear casing 13 in suitable journal and thrust bearings 14. This central driving pinion 12 has single helical teeth, and meshes (Figure 4) with three like intermediate gears 40 supported on layshafts 41, (of which one 15 with its layshaft 16 is shown in Figure 1) surrounding the driving pinion and spaced equi-angularly about the driving shaft parallel thereto. Each layshaft is supported in the reduction gear casing 13 by thrust and journal bearings such as 17 and 18, the journal bearings conveniently being of the roller type and the thrust-bearings of the ball type.

The layshafts also support three like straight-toothed spur gears, such as 19 in Figure 1, one on each shaft, meshing with an internally toothed ring or annulus gear 20. The latter has an axial forward extension 21 which is internally splined at 22, the splines engaging complementary external formations on a circular flange 23 carried coaxially by the airscrew shaft 24. The internally toothed ring 20 is thus located coaxially with the drive shaft 10 and with the airscrew shaft 24 by the three spur gears 40, while the splined engagement at 22 between the ring 20 and airscrew shaft 24 provides a degree of "float" allowing for a limited degree of malalignment in the drive. The airscrew shaft is suitably supported in the reduction gear casing by a journal bearing 25 and a thrust bearing 26. The gear is arranged so that there is a reduction in speed between the helical driving pinion 12 and the helical gears 40 on the layshafts, and between the straight spur gear such as 19 and the internally toothed ring 20.

It will be appreciated that the transmission of power through the reduction gear outlined above results in axial thrust loadings on the layshafts such as 16, with an axial reaction thrust in the opposed sense on the central driving pinion 12.

In this embodiment of the invention it is arranged that the axial thrust loading on one of the layshafts 16 is measured, whereby an assessment can be made of the total torque or power transmitted through the drive. The measurement of axial thrust on the layshaft is effected by means of a piston-and-cylinder hydraulic balancing device, including a source of hydraulic power to introduce hydraulic pressure into the cylinder, to load the layshaft in the axial sense, with porting uncovered as a result of limited axial movement. The magnitude of hydraulic pressure applied to the piston and cylinder device and shown on the gauge 42 (Figure 4) is thus a measurement of the thrust required to balance the axial thrust on the layshaft, i. e. it is a measurement of torque from which, in turn, an assessment of total power transmitted through the reduction gear can be obtained by suitable correlation with the shaft speed.

As shown in Figure 3 the layshaft 16 is provided with a sleeve 30 secured to the outer race 31 of its thrust bearing 17, which sleeve 30 is slidably mounted within a housing 34 mounted in the reduction gear casing, whereby the layshaft 16 is permitted a certain limited degree of axial movement. A cylinder element 32 is supported internally in this sleeve and comprises a flanged portion 33 which is axially nipped between the bearing race 31 and an annular nut 35 screwed internally of the sleeve. This nut 35 is locked by any suitable means, whereby, the sleeve and cylinder form a unitary structure.

The external housing has an end cover wall 36, which provides support for a hydraulic gear pump 37 bolted to its external face. The wheel 38 of the gear pump is driven by the layshaft 16 and lies coaxially therewith. The drive is effected through a suitable splined quill shaft 39.

The end cover wall 36 also supports internally of the housing structure a piston element 130. This piston element 130 is of sleeve-like form, and has two external cylindrical formations 131, 132 of differing diameters, the formation 131 is sealed with corresponding internal cylindrical surface 133 by means of a sealing ring 135 carried by the piston sleeve 130, whilst the formation 132 seals with sealing ring 136 carried in the cylinder 32. There is thus constituted an annular piston area therebetween. The outer diameter cylindrical surface 131 of the piston sleeve is recessed to accommodate the sealing ring 135, which co-operates with an internal cylindrical surface 133 in the axial region of the flange 33 of the cylinder element previously mentioned. The lesser diameter cylindrical surface 132 of the piston sleeve which is axially spaced (towards the end cover plate) from the outer diameter surface 131, co-operates with a sealing ring 136, accommodated in an internal recess in the cylinder element.

Hydraulic pressure supply from the pump 37 is ducted through a suitable inlet passage 137 in the end cover and piston sleeve into the space between the two seals and between the piston and cylinder elements, whereby an axial load results as between the piston element 130, (which is supported by the housing structure 36) and the cylinder element 32 (which is supported by the outer race 31 of the thrust bearing).

It is arranged that the sealing ring 136 supported by the cylinder element 32 and sealing with the lesser diameter cylindrical surface 132 on the piston 130, operates as a valve covering and uncovering a number of radially directed exit ports 138 communicating as between the cylinder space and an outflow passage in the piston sleeve element. The axial loading on the layshaft 16, transmitted through the thrust bearing 17, is such as to tend to move the sealing ring 136 to cover the ports 138, in the normal sense of power transmission through the gear. If the ports are covered, the hydraulic pressure in the cylinder space, supplied by the gear pump 37 will increase, since no leakage flow is permitted, applying an axial load to the cylinder element 32, until this load substantially equals the axial load arising due to the transmission of power through the helical gear. The cylinder element 32 is thereby caused to move so that the sealing ring 136 uncovers the porting partially, and permits a relief flow of hydraulic fluid. The pressure existing within the piston and cylinder device will stabilise according to the value of the axial loading on the layshaft 16, and the value of this pressure can be measured by a suitable gauge, 42, (Figure 4) to indicate torque, and by suitable correlation with the shaft speed, the total power transmitted through the drive can be assessed, assuming equality of torque transmission through each layshaft.

It will be appreciated that with a plurality of helical gears or shafts arranged in planetary fashion, it is undesirable to permit undue axial freedom of any one of the three intermediate gears, and in the arrangement of the thrust measuring device described above, it is arranged that the distance of travel of the shaft concerned between the normal thrust stop and overrun thrust stop is kept to a low value, for example of the order of, say, .006". The maximum movement of the cylinder element in the sense of covering the ports can then be limited to say .002" of this distance whilst having ports which provide a comparatively large area of opening for small axial movement. Thus, assuming, the second sealing ring 136 is against the normal thrust stop 139 (as will be the case for example if the pump fails and before the pump becomes operative), on rise of pressure in the cylinder the second sealing ring can be arranged to have a travel of .002" before port opening commences, a further travel of .002" between the points at which port opening commences and the ports are fully open, and a further travel of .002" between the latter point and the position in which the cylinder element 32 abuts against the overrun thrust stop.

It will be appreciated that the embodiment described above provides a unitary structure of thrust measuring device which can be readily installed in a reduction gear assembly, involving simplicity of installation, and inconsiderable weight. The hydraulic supply to the pump can readily be effected from a low pressure supply in the engine.

It will be observed that in the above embodiment in order to allow the torque to be distributed equally between the three layshafts, the ring gear 20 (Figure 1) is splined to the flange 23 so that it can adjust itself to compensate for the axial displacement of the layshaft 16.

However in some cases it may be undersirable to allow for such "float" of the ring gear 20, which may need to be bolted to the flange 23 as shown in Figure 2.

Such a construction is shown in Figure 5 of the drawings. In this construction the invention is employed to measure the torque transmitted from a single helical toothed driving wheel 50 to a co-axial straight tooth annulus, which is supported by the driven shaft in bearings to be concentric with the driving shaft, i. e. the annulus is not permitted radial float. The helical driving gear meshes with three like similarly toothed gears 51 supported on layshafts arranged equi-angularly about the axis of the driving shaft and parallel thereto. Each layshaft additionally carries a second gear-wheel of straight tooth formation meshing with the internally toothed driven annulus as above described with reference to Figure 1.

The three layshafts are each mounted on journal bearings and a thrust bearing and each has a hydraulic piston-and-cylinder thrust-opposing device 52, associated with it. The thrust-opposing device (Figures 3 and 8) comprises a stepped cylinder 32 secured to the outer race 31 of the thrust bearing and surrounding the layshaft, an annular piston structure 130, and two sealing rings 135, 136 of different diameters co-operating with the two cylindrical walls, the one 133 on the cylinder 32 and the other 132 on the piston structure 130.

One of the three devices is as illustrated in Figure 3 and has a ring of inlet ports 140 connected to the outlet of a gear pump 37 driven by the layshaft with which the device is associated; this device also has a ring of exit ports 138 connected to the reservoir of the gear pump and constitutes the control device of the group. The three cylinders are interconnected hydraulically by pipes 53 (Figure 5) so as to provide for equality of hydraulic pressure therein. The pipes 53 connect with ports 180 (Figure 8) in the other two devices, but these devices have no exit ports. The escape area of the exit ports 138 in the control device is varied by the lesser diameter sealing ring of the associated cylinder, when the cylinders move due to thrust developed as a result of torque transmission from the driving wheel.

This hydraulic pressure is measured by a suitable measuring device 54 which may be calibrated to indicate the torque transmitted from the driving wheel.

It will be appreciated that since the hydraulic pressure is the same in the three cylinders, the three layshafts will adjust themselves until their axial thrusts are the same and since the axial thrust of a layshaft is proportional to the torque transmitted through it, the torque transmitted from the driving wheel will always be equally divided among the three layshafts and the torque indicated by the pressure measuring device will permit an accurate assessment of the torque transmitted from the driving wheel.

The form of the torque-meter ensures that the torque transmitted through the three gear trains is always equally divided between them, avoiding the provision of radial float of the annulus as in the arrangement described above with reference to Figures 1 and 4, to ensure that the torque is equally divided among the three trains.

In the embodiment of the invention diagrammatically illustrated in Figure 6, the driving pinion 60 is arranged to transmit torque to a shaft through two pinions 61, 62 of which the pinion 61 transmits two thirds of the torque and the pinion 62, one third.

The layshafts of the pinions 61, 62 each has a hydraulic thrust-opposing device associated with it, but since twice as much torque is transmitted through the pinion 61 as is transmitted through the pinion 62, the hydraulic thrust-opposing device 63, associated with the pinion 61 has twice the effective area of the hydraulic thrust opposing device 64 associated with the pinion 62. The two devices can therefore be interconnected by the pipe 65, being supplied from a source of hydraulic pressure through the pipe 66, the actual pressure being determined by the area of the exit ports to the pipe 68 and measured by the gauge 67 to indicate the thrust transmitted from the pinion 60.

In the construction diagrammatically illustrated in Figure 7, the pinion 70 is arranged to transmit torque through two pinions 71, 72 to two independent shafts and since the relation between the torque transmitted by each of the pinions cannot be predicted, each has its own gear pump 73, thrust-opposing device 74 and gauge 75, an indication of the total torque transmitted from the driving pinion 70 being a summation of the torque measurement effected by each of the gauges.

Of course the measurement could be obtained by associating a torque-meter according to the invention directly with the driving pinion, but in most constructions it is not convenient to do so.

We claim:

1. A gear train comprising a stationary casing structure; a layshaft having freedom for limited axial movement relative to said casing structure; a gear of the kind which develops axial thrust when torque is transmitted through the gear train supported on said layshaft; thrust bearing means supporting said layshaft; housing means carrying said thrust bearing means and including a cylinder element; a piston element arranged for sliding in said cylinder element and fixed with respect to said casing structure; means for supplying pressure fluid to the space within said cylinder element and on one side of said piston element and to oppose the axial thrust transmitted to said housing from said gear; valve means to control the escape of said fluid from said space comprising a variable-area exit port provided in one of said elements, the area of said port being determined by the relative position of the two elements; and means for measuring the pressure in said space.

2. A gear train according to claim 1 wherein the means for supplying pressure fluid comprises a pump driven by said layshaft the discharge of which is connected to said space.

3. A gear train according to claim 2 further comprising a second layshaft having freedom for limited axial movement relative to said casing structure; a second gear of the kind which develops axial thrust when torque is transmitted through the gear train supported on said second layshaft; second thrust bearing means supporting said second layshaft; second housing means carrying said second thrust bearing means and including a second cylinder element; a second piston element arranged for sliding in said second cylinder element and fixed with respect to said casing; and a connecting duct connecting the space within said second cylinder element and on one side of said second piston element with the space within the first cylinder element and on one side of the first piston element; whereby pressure fluid from the pump is supplied to the space within said second cylinder element through the space in the first cylinder element to oppose the axial thrust transmitted to said second housing from said second gear.

LIONEL HAWORTH.
COLIN BAYNES TAYLOR.

REFERENCES CITED

The following references are of record in the file of this patent:

UNITED STATES PATENTS

| Number | Name | Date |
|---|---|---|
| 1,272,041 | Herr | July 9, 1918 |
| 2,289,285 | Chilton | July 7, 1942 |
| 2,386,367 | Taylor | Oct. 9, 1945 |
| 2,444,363 | Newcomb | June 29, 1948 |
| 2,461,001 | Palen | Feb. 8, 1949 |